Jan. 9, 1923.
S. L. WATSON.
SCREW DRIVER.
FILED MAR. 15, 1922.
1,441,956.
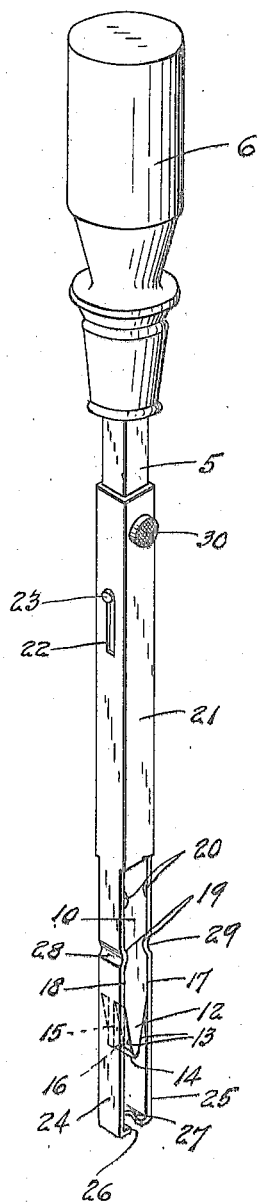
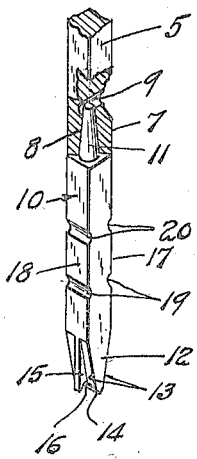
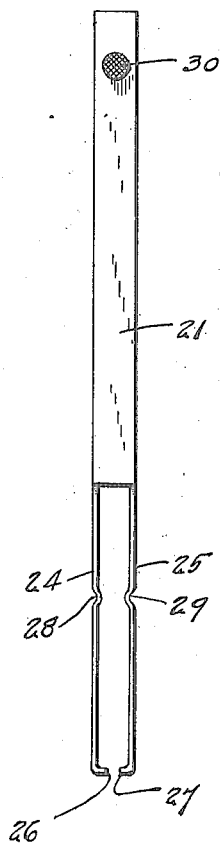
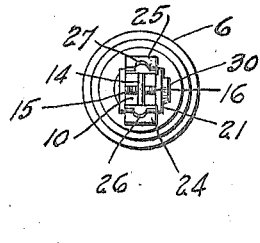
Inventor
Shelly L. Watson
By Watson E. Coleman
Attorney Patented Jan. 9, 1923.

1,441,956

UNITED STATES PATENT OFFICE.

SHELLY L. WATSON, OF SPRINGFIELD, TENNESSEE, ASSIGNOR OF ONE-HALF TO J. LEE BINKLEY, OF SPRINGFIELD, TENNESSEE.

SCREW DRIVER.

Application filed March 15, 1922. Serial No. 544,019.

*To all whom it may concern:*

Be it known that I, SHELLY L. WATSON, a citizen of the United States, residing at Springfield, in the county of Robertson and State of Tennessee, have invented certain new and useful Improvements in Screw Drivers, of which the following is a specification, reference being had to the accompanying drawings.

This invention relates to screw drivers and has for its object to provide a screw driver capable of placing a screw in an obscure corner or place, and holding the same until the screw driver has forced the screw into the work.

It is another object of the invention to provide a screw driver of this character having means for holding the screw in engagement with the end of the screw driver to prevent accidental disengagement of the screw driver from the screw when the screw is being urged into the work.

It is still a further object of the invention to provide a screw driver of this character including a shank having a socket for the reception of a screw driver bit, and means slidable on the shank of the screw driver and over the bit for holding the screw in engagement with the bit.

With these and other objects in view, the invention consists in the improved construction and arrangement of parts to be hereinafter more particularly described, fully claimed and illustrated in the accompanying drawings, in which:—

Figure 1 is a perspective view of a screw driver constructed in accordance with an embodiment of the invention;

Figure 2 is a fragmentary perspective view of the detachable bit of the screw driver, the shank of the screw driver being shown in section;

Figure 3 is a view in elevation of the movable sleeve; and

Figure 4 is an end view of the structure shown in Figure 1.

Referring to the drawings, 5 designates a many sided shank of a screw driver, having a handle 6 on one end thereof. The opposite end 7 of the shank is provided with a substantially conical socket 8, an opening 9 being provided in the shank to permit access to the apex portion of the socket.

In connection with the shank 5, a many sided screw driver bit shank 10 is provided, the shank of the bit having one end reduced to provide a tapering extension 11, said extension being substantially conical and adapted to frictionally engage the socket 8 to bind the bit 10 in engagement with the screw driver and prevent independent movement of the bit relative to the shank of the screw driver. The end 12 of the shank 10 has its opposed sides 13 tapered to provide a screw driver bit 14 adapted to engage the head of a screw. Projecting from each of the sides 13 is a wing 15, the end face 16 of the wing being constructed to conform to the contour of the head of the screw. It will be noted that the ends 16 are disposed in spaced relation to the work engaging portion or screw driver bit 14 of the shank 10 so as not to interfere with the engagement of the bit with the screw and at the same time to prevent accidental disengagement of the screw driver from the screw. The opposed sides 17 and 18 of the bit 10 are provided with recesses 19 and 20 which extend laterally of said sides and in spaced parallel relation to each other, the purpose of which will be hereinafter described.

Slidably mounted on the shank is a sleeve 21 having a longitudinally extending slot 22 in its central portion through which a pin 23, carried by the shank, extends, said pin limiting sliding movement of the sleeve. The sleeve 21 is made of resilient material, the opposed sides adjacent one end portion of the sleeve being removed so as to permit the remaining sides 24 and 25 to serve as clamping arms, said arms being sprung inwardly so as to constantly engage the bit or shank 5 of the screw driver. The extremities of the arms 24 and 25, are crimped to provide jaws 26 and 27 adapted to engage the shank of the screw beneath the head thereof. The arms 24 and 25 are also provided with crimps 28 and 29 at their central portions, adapted to alternately engage the recesses 19 and 20 of the shank 10. Carried by the opposite end portion of the sleeve 21 is a finger piece or rest 30 having its upper face knurled by means of which the sleeve 21 may be moved longitudinally of the shank.

In the use of the device, when it is desired to place a screw in an obscure corner, or in fact any place, the sleeve is moved away from the handle 6 so as to permit the insertion of the screw between the jaws 26 and 27 and the insertion of the end or screw driver bit 14 in the slot of the screw. The sleeve 21 is then moved toward the handle 6 through the medium of the finger piece 30, whereupon the crimped portions 28 and 29 enter the innermost recesses 20 of the bit 10, thereby permitting the arms 24 and 25 to move toward the shank and hold the screw in engagement with the bit 14, so that movement of the screw independently of the screw driver is prevented. After the screw has been driven in to the extent necessary and it is desired to drive the screw home, the sleeve 21 is moved inwardly so as to cause the crimped portions 28 and 29 to engage the sides of the bit 10 and cause the jaws 26 and 27 to move away from the screw, whereupon the screw driver may be readily disengaged from the screw.

From the foregoing it will be readily seen that this invention provides a novel form of screw driver which greatly facilitates the placing of a screw at any point, in addition to saving time and labor. The sides of the sleeves 21 are adapted to engage the corresponding sides of the shank 5 and bit 10. In view of this there is no danger of the frictional engagement of the extension 11 with the walls of the socket 8 being interfered with as the sleeve 21 will prevent rotation of the bit 10, relative to the shank 5 upon rotation of the shank 5, so that regardless of the position of the arms 24 and 25, the bit is always firmly locked in position. By providing a removable bit 10, bits of various lengths and sizes may be used, according to the work and the size and shape of the screw, and as there are no screws or like fastening devices to be manipulated, the bits can be readily applied and removed. It will also be noted that this structure permits the shank of the screw driver to be made round, rectangular, or any shape desired, and the bits constructed accordingly. I do not desire to be limited to the idea of constructing the shank and bit in separate pieces, as the shank and bit may be made from a single piece of material.

What is claimed is:—

1. A screw driver comprising a many-sided shank having a socket in one end portion thereof, a many-sided screw driver bit having one end thereof reduced and adapted to frictionally engage the walls of the socket, a many-sided sleeve slidable on the shank and the bit, certain of the sides of said sleeve being extended beyond the ends of the sleeve to provide arms, said arms having jaws formed on their ends for holding a screw in engagement with the opposite end of the bit, said many-sided sleeve preventing rotation of the bit relative to the shank upon rotation of said shank and sleeve.

2. A screw driver comprising a many-sided shank having a socket in one end portion thereof, a many-sided bit having one end thereof reduced and adapted to frictionally engage the walls of the socket, the opposed sides of the bit having recesses, a many-sided sleeve slidable on the shank and the bit, certain of the sides of said sleeve being extended beyond the end of the sleeve to provide arms, said arms having lugs formed therein adjacent the junction of the arms with the sleeve, the ends of said arms being formed into jaws adapted to hold a screw in engagement with the opposite end of the bit, the lugs of said arms being normally disposed in the recesses of the bit and coacting with said sleeve to prevent rotation of the bit relative to the shank upon rotation of the shank and sleeve.

In testimony whereof I hereunto affix my signature.

SHELLY L. WATSON.